US010280927B2

(12) United States Patent
Niedermeier

(10) Patent No.: US 10,280,927 B2
(45) Date of Patent: May 7, 2019

(54) VALVE AND PUMP ARRANGEMENT WITH VALVE

(71) Applicant: KSB Aktiengesellschaft, Frankenthal (DE)

(72) Inventor: Peter Niedermeier, Mannheim (DE)

(73) Assignee: KSB Aktiengesellschaft, Frankenthal (DE)

( * ) Notice: Subject to any disclaimer, the term of this patent is extended or adjusted under 35 U.S.C. 154(b) by 754 days.

(21) Appl. No.: 14/778,680

(22) PCT Filed: Mar. 13, 2014

(86) PCT No.: PCT/EP2014/054935
§ 371 (c)(1),
(2) Date: Sep. 21, 2015

(87) PCT Pub. No.: WO2014/146964
PCT Pub. Date: Sep. 25, 2014

(65) Prior Publication Data
US 2016/0047385 A1    Feb. 18, 2016

(30) Foreign Application Priority Data

Mar. 22, 2013   (DE) .................. 10 2013 004 908

(51) Int. Cl.
*F04D 15/00*    (2006.01)
*F04D 29/10*    (2006.01)
(Continued)

(52) U.S. Cl.
CPC .......... *F04D 15/0005* (2013.01); *F04D 1/00* (2013.01); *F04D 15/00* (2013.01);
(Continued)

(58) Field of Classification Search
CPC .......... F04D 1/0005; F04D 1/00; F04D 15/00; F04D 15/0022; F04D 15/0263;
(Continued)

(56) References Cited

U.S. PATENT DOCUMENTS 2,960,938 A    11/1960   Williams
3,359,911 A *  12/1967   Weinstein ............. F04D 29/044
                                              417/423.11
(Continued)

FOREIGN PATENT DOCUMENTS

DE      1 688 896 U    12/1954
DE      1 930 674 U     1/1966
(Continued)

OTHER PUBLICATIONS

International Preliminary Report on Patentability (PCT/IB/373) issued in PCT Application No. PCT/EP2014/054935 dated Sep. 22, 2015, including English translation of document C2 (German-language Written Opinion (PCT/ISA/237)) previously filed on Sep. 21, 2015 (ten (10) pages).
(Continued)

*Primary Examiner* — Timothy L Maust
(74) *Attorney, Agent, or Firm* — Crowell & Moring LLP

(57)    ABSTRACT

The invention relates to a pump arrangement, in particular a centrifugal pump, in particular a main coolant pump for power stations, comprising a pump housing (2), which defines an interior (3) with an inlet opening (4) for aspirating a conveying medium and with an outlet opening (5) for expelling the conveying medium and which also defines a chamber (7) that is connected to the interior (3), a seal water system (22), which has a first conduit system (29) in order to supply seal water into the chamber (7) defined by the pump housing (2), a second conduit system (32) for evacuating a controlled leakage flow from the chamber (7) defined
(Continued)

by the pump housing (2), and a protective valve (35), which is arranged in the second conduit system (32) in order to block the leakage flow that is evacuated from the chamber (7). The invention further relates to a protective valve (35) and to the use of a protective valve (35) in a pump arrangement (1).

8 Claims, 4 Drawing Sheets

(51) Int. Cl.
*F04D 29/12* (2006.01)
*F16K 31/00* (2006.01)
*F04D 1/00* (2006.01)
*F16K 1/32* (2006.01)

(52) U.S. Cl.
CPC ....... *F04D 15/0077* (2013.01); *F04D 29/108* (2013.01); *F04D 29/128* (2013.01); *F16K 1/32* (2013.01); *F16K 31/002* (2013.01)

(58) Field of Classification Search
CPC ........ F04D 29/108; F04D 29/128; F16K 1/32; F16K 1/002
See application file for complete search history.

(56) References Cited

U.S. PATENT DOCUMENTS

| | | | |
|---|---|---|---|
| 3,574,473 A | | 4/1971 | Gaffal |
| 3,843,140 A | | 10/1974 | Mayer et al. |
| 4,587,076 A | * | 5/1986 | Bonhomme .......... F04D 29/106 277/348 |
| 4,613,141 A | | 9/1986 | Heinen |
| 4,669,279 A | * | 6/1987 | Maeda ................ H02K 9/20 310/54 |
| 5,511,576 A | * | 4/1996 | Borland ................ F16K 17/383 137/72 |
| 5,632,297 A | * | 5/1997 | Sciullo .................. F16K 17/383 137/72 |
| 6,279,340 B1 | * | 8/2001 | Butterworth .......... F04D 29/023 62/468 |
| 6,772,958 B1 | * | 8/2004 | Lamb ...................... F01P 7/16 236/100 |
| 6,915,958 B2 | * | 7/2005 | Colas ...................... F01P 7/167 236/34.5 |
| 2002/0074418 A1 | | 6/2002 | Smith |
| 2004/0155409 A1 | * | 8/2004 | Trygg ................. F16J 15/3404 277/358 |
| 2014/0360210 A1 | * | 12/2014 | Lapp ...................... F25B 1/053 62/84 |

FOREIGN PATENT DOCUMENTS

| | | |
|---|---|---|
| DE | 1 800 254 C | 7/1969 |
| DE | 24 60 314 A1 | 7/1975 |
| DE | 34 47 102 A1 | 7/1986 |
| DE | 38 04 183 A1 | 8/1989 |
| DE | 38 14 519 A1 | 11/1989 |
| DE | 38 04 183 C2 | 11/1994 |
| DE | 10 2006 047 003 A1 | 4/2008 |
| GB | 1 497 257 A | 1/1978 |

OTHER PUBLICATIONS

International Search Report (PCT/ISA/210) dated Jul. 31, 2014 with English-language translation (ten (10) pages).
German-language Written Opinion (PCT/ISA/237) dated Jul. 31, 2014 (seven (7) pages).
German-language Office Action dated Sep. 17, 2013 (four (4) pages).

* cited by examiner

US 10,280,927 B2

VALVE AND PUMP ARRANGEMENT WITH VALVE

CROSS REFERENCE TO RELATED APPLICATIONS

This application is a continuation of PCT International Application No. PCT/EP2014/054935, filed Mar. 13, 2014, which claims priority under 35 U.S.C. § 119 from German Patent Application No. 10 2013 004 908.3, filed Mar. 22, 2013, the entire disclosures of which are herein expressly incorporated by reference.

BACKGROUND AND SUMMARY OF THE INVENTION

The invention concerns a pump arrangement, in particular a centrifugal pump, in particular a main coolant pump for power stations, a protective valve and the use of a protective valve in a pump arrangement.

Such pumps have multi-stage hydrodynamic sealing systems with a so-called controlled leakage. These axial face sealing systems allow a defined pressure division between the stages of the axial face sealing system, and the dissipation of the heat yield from the individual steps which amounts to several kilowatts. In normal operation, the controlled leakage is fed from a sealing water system which thus ensures a seal against the system and prevents the hot delivery medium from entering the seal housing. To protect the sealing part from high temperatures and shocks, it must be ensured that if no sealing water is available, either the inflowing hot water is cooled or the pump is shut down and the leakage valve closed.

The object of the invention is to create a device which, on failure of the sealing water supply, ensures an independent blocking of the controlled leakage and can maintain this block during further operation.

The object of the invention is achieved by a pump arrangement with a pump housing which defines an interior with an inlet opening for aspirating a delivery medium and an outlet opening for expelling the delivery medium, and which also defines a chamber connected to the interior, a sealing water system comprising a first conduit system for supplying sealing water to the chamber defined by the pump housing, a second conduit system for evacuating a controlled leakage flow from the chamber defined by the pump housing, and a protective valve arranged in the second conduit system for blocking the leakage flow evacuated from the chamber.

In a preferred implementation of the pump arrangement, the chamber is a multi-stage hydrodynamic sealing system which securely seals the chamber.

In a particular embodiment, the sealing system comprises a plurality of spring-mounted axial face seals.

The security of the sealing system is further increased if the sealing system comprises a pressure-controlled seal which is open in operation, in particular a nitrogen seal, water seal or similar.

A particularly good operating method is achieved if medium is extracted from the leakage flow via a conduit and supplied to a pressure chamber in the seal arranged inside the chamber.

Since the leakage protection valve, once closed, is not able to open by itself as long as a positive pressure predominates in front of the protection valve, a shut-off fitting is connected in parallel to the protective valve.

The object of the invention is furthermore achieved by a protective valve with a valve housing part, a valve chamber formed in the valve housing part, a valve housing cover which is arranged on the valve housing part and comprises a passage bore communicating with the valve chamber, a valve seat provided on the housing cover, a valve tappet provided with a valve cone and a rest device, a spring device supported on the valve housing cover and lying on the rest device, and with thermosensitive actuators which expand on heating arranged on the side of the rest device opposite the spring device.

According to the invention, the actuators are made from a form-memory alloy or comprise a bimetal arrangement. This offers many design possibilities for the actuators.

The actuators may be configured as a ring or sleeve, of one or more pieces, and/or as a cup spring, whereby these can be optimally adapted to the conditions in the valve chamber.

In an advantageous refinement of the invention, the valve housing part has a housing portion with reduced inner diameter which serves as a support shoulder for the actuators.

According to the invention, an axial groove is formed on the inner periphery of the housing portion facing the valve tappet, and an axial groove oriented parallel to the axial groove is formed on the valve tappet, wherein an adjustment spring is inserted in said grooves. The resulting twist prevention serves to ensure that the valve cone and valve seat always meet at the same point and that the actuators are not distorted.

The object of the invention is furthermore achieved by the use of such a protective valve in a pump arrangement.

Exemplary embodiments of the invention are shown in the drawings and described in more detail below. These show:

DETAILED DESCRIPTION

Figure 1:
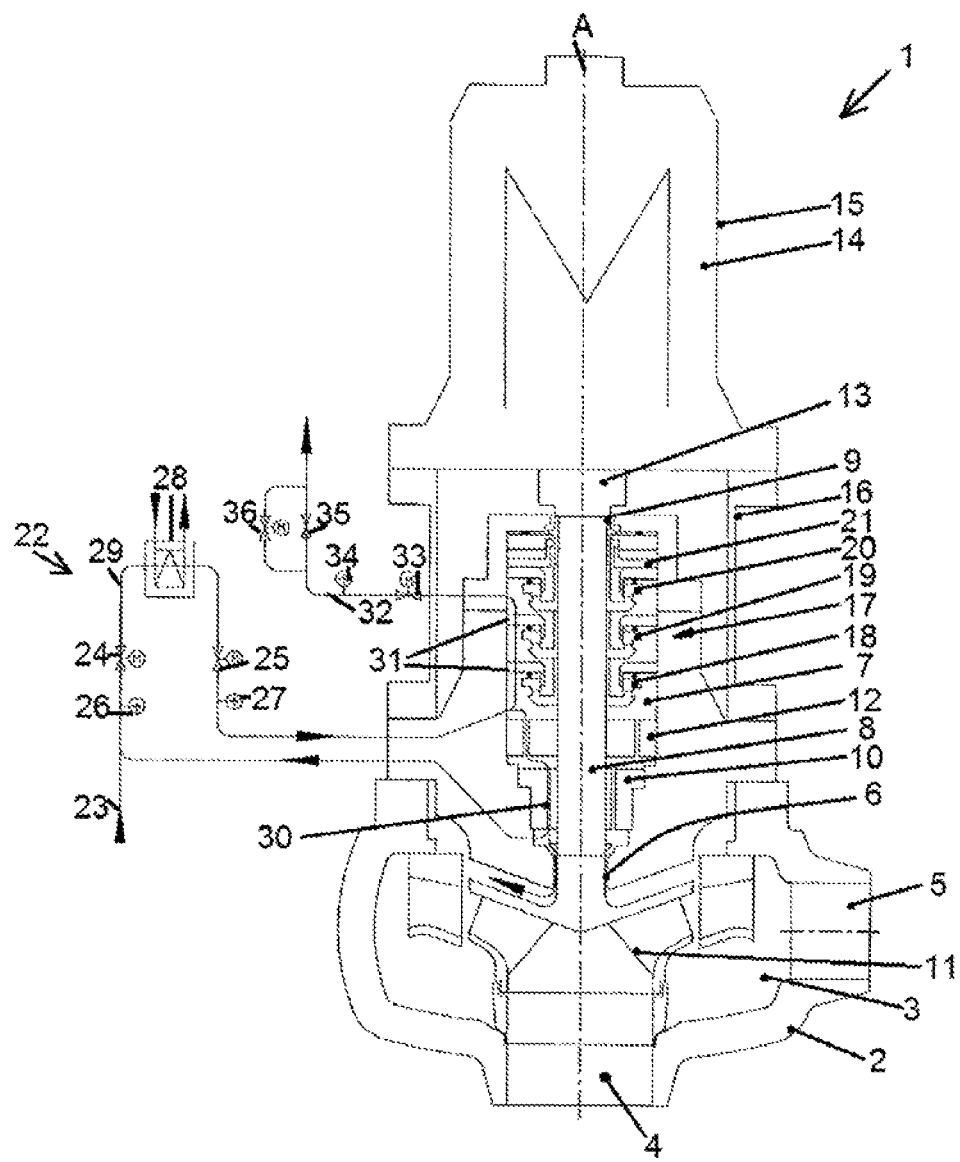
FIG. 1 a pump arrangement according to an embodiment of the invention.

FIG. 1 shows a pump arrangement 1 in the form of a main coolant pump. The pump arrangement 1 has a pump housing 2. The pump housing 2 defines an interior 3 with an inlet opening 4 for aspirating a delivery medium, and an outlet opening 5 for expelling the delivery medium. The interior 3 is connected via an orifice 6 with a chamber 7 which is also defined by the pump housing 2.

An impeller shaft 8 extends from the interior 3 through the orifice 6 into the chamber 7 and ends close to or in an orifice 9 opposite the orifice 6. The impeller 8 is mounted rotatably about the rotary axis A by means of a bearing arrangement 10 accommodated in the chamber 7, close to the orifice 6. An impeller 11 is attached to a shaft end of the impeller shaft 8 lying inside the interior 3. An auxiliary impeller 12 is attached to the impeller shaft 8 inside the chamber 7, at a defined distance from the bearing arrangement 10. The shaft end of the impeller shaft 8 close to the orifice 9 is connected to a drive shaft 13 of a drive motor 14 which is arranged coaxially to the rotary axis A, wherein the housing 15 of the drive motor 14 is connected to the housing 2 by means of a lantern piece 16.

In the chamber 7, a multi-stage hydrodynamic sealing system 17 is provided which comprises a plurality of spring-mounted axial face seals 18, 19, 20, and if required a pressure-controlled seal 21, for example a nitrogen seal, water seal or similar, which is open in operation. The sealing system 17 seals the chamber 7 fluid-tight against the environment at the orifice 9.

During operation of the pump arrangement 1, a sealing water system 22, forming at least part of a fluid circuit, feeds medium—for example water with added additives in some cases, referred to below as sealing water—which is supplied via a supply conduit 23, via a first conduit system 29 provided with a plurality of shut-off fittings 24, 25, a plurality of temperature sensors 26, 27 and a cooler 28, into the chamber 7 between the auxiliary impeller 12 and the sealing system 17. The auxiliary impeller 12 delivers part of the sealing water through the bearing arrangement 10. The sealing water may be guided through channels 30 formed in the bearing arrangement 10 and/or along the plain bearing surfaces (not shown). The sealing water is evacuated from the chamber 7 again between the bearing arrangement 10 and the orifice 6, wherein a small part is still delivered into the interior 3. The sealing water thus prevents the penetration of delivery medium from the interior 3 into the chamber 7, and serves as a coolant and lubricant for the bearing arrangement 10.

The other part of the sealing water, which is not evacuated through the bearing arrangement 10, forms a controlled leakage flow and is guided via bypass channels 31 into and through the axial face seals 18, 19. Choke sections (not shown) fitted to the bypass channels 31 reduce the pressure in stages, and hence distribute the pressure load over the axial face seals 18, 19, 20. The final axial face seal 20 before the seal 21 does not have such a bypass channel. The leakage flow is evacuated from the chamber 7 between the axial face seal 19 and the axial face seal 20, and guided into a second conduit system 32. After leaving the chamber 7, the leakage flow passes a shut-off fitting 33, a temperature sensor 34 and a protective valve 35, wherein a further shut-off fitting 36 which is closed in normal operation is connected in parallel to the protective valve 35.

The reaching of a leakage flow temperature of usually 100° C. is associated with an automatic shut-down of the pump arrangement 1. This leads to a reduction in temperature of the sealing water in the chamber 7 and of the leakage flow, since sealing water is pumped into the chamber 7 for cooling.

On a fault in the sealing water system 22, for example in the absence of the sealing water supplied via the supply line 23, the temperature inside the chamber 7 however rises further since the sealing water delivered to the chamber 7 is no longer cooled, or hot delivery medium penetrates from the interior 3 into the chamber 7. If the sealing water in the chamber 7 and hence the leakage flow reaches a specific temperature, the protective valve 35 closes. Because of the construction of the protective valve 35, its opening remains excluded even after a subsequent fall in temperature.

Figure 2:
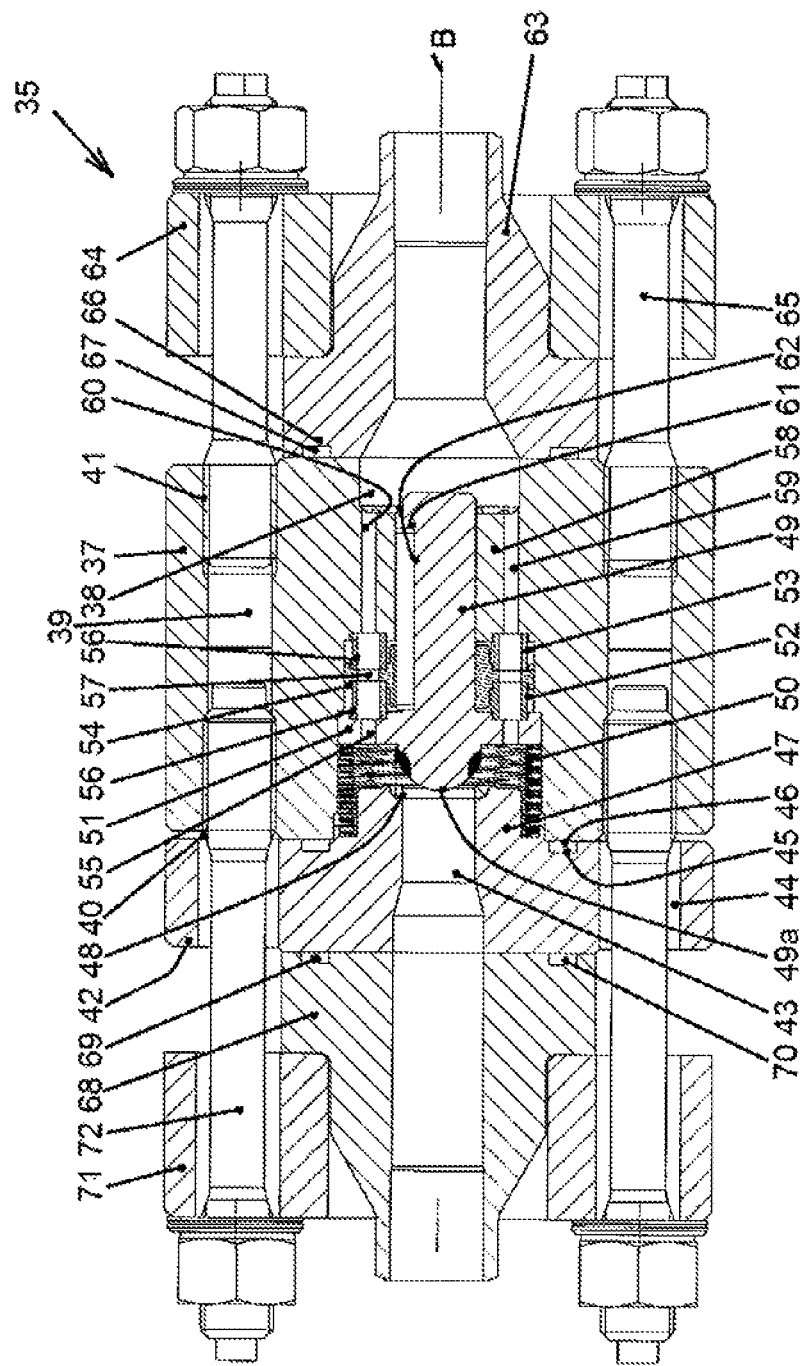
FIG. 2 the longitudinal section through a protective valve used in the valve arrangement of FIG. 1, FIG. 3 a further embodiment of the protective valve in longitudinal section, and FIG. 4 a further embodiment of the pump arrangement according to FIG. 1.

An embodiment of the protective valve 35 shown in detail in FIG. 2 comprises a valve housing part 37 which is provided with a valve chamber 38 and a plurality of passage openings 39 arranged around the valve chamber 38, wherein the passage bores 39 extend parallel to a center longitudinal axis B of the valve housing part 37. The passage bores 39 have threaded regions 40, 41 at their ends. A valve housing cover 42 is arranged on the side facing away from the shut-off fitting 33 in FIG. 1 and has a passage bore 43 communicating with the valve chamber 38. The valve housing cover 42 has a plurality of passage bores 44 which are oriented lying overlapping the passage bores 39. On the side facing the valve housing part 37, the valve housing cover 42 has an annular groove 45 which is formed concentrically to the center longitudinal axis B and in which a sealing device 46 is arranged, for example a spiral graphite seal, O-ring or similar, which seals the connecting point of the valve housing part 37 and valve housing cover 42 fluid-tightly.

The valve housing cover 42 has an annular protrusion 47 extending into the valve chamber 38, the free end of which is formed as the valve seat 48; a valve tappet 49 placed in the valve chamber 38 may rest with its valve cone 49a on said valve seat 48. A spring device 50, for example a cup spring packet, a spring cage, a wavy annular spring or similar, is supported on the valve housing cover 42 and rests against a rest device 51 formed as a ring on the valve tappet 49.

Several thermosensitive actuators 52, 53 are arranged on the side of the rest device 51 lying opposite the spring device 50, and on heating expand in the axial direction i.e. along the center longitudinal axis B. The actuators 52, 53 are for example made of a form-memory alloy or comprise a bimetal arrangement.

In form-memory alloys with two-way effect, the actuators 52, 53 contract again on cooling, whereas in form-memory alloys with one-way effect, a force is generated in one direction only, wherein the return force is then applied by the spring device.

The actuators 52, 53 may for example be formed as a ring or sleeve, of one or more pieces, and/or as a cup spring. A plurality of actuators 52, 53 here surround the valve tappet 49. In the exemplary embodiment shown, each set of actuators 52 and 53 is internally connected in parallel, and the two sets are connected together in series by means of a holding device 54. The series connection is advantageous for creating a greater actuating travel and redundancy of the actuators, the parallel connection for producing higher actuating forces.

The rest device 51 has a plurality of passage openings 55 which overlap with the passage openings 56 present in the actuators 52, 53 and the passage openings 57 formed in the holding device 54.

The valve housing part 37 has a housing portion 58 with reduced inner diameter which serves as a support shoulder for the actuators 53. The inner diameter of the housing portion 58 is slightly larger than the valve tappet 49, so that this can easily be moved to and fro along the center longitudinal axis B. The housing portion 58 also comprises passage openings 59 which in turn are aligned with the passage openings 55, 56, 57, so that during normal operation the controlled leakage flow can flow unhindered through the protective valve.

To produce a heating of the actuators 52, 53 which is as rapid and as even as possible, the passage openings 55, 56, 57, 59 may be arranged such that they do not overlap axially.

So that the valve tappet 49 cannot rotate inside the valve chamber 38 and the passage openings 55, 56, 57, 59 no longer align, an axial groove 60 is formed on the inner periphery of the housing portion 58 facing the valve tappet 49, and an axial groove 61 oriented parallel to axial groove 60 is formed on the valve tappet 49; an adjustment spring 62 is inserted in said grooves. The twist protection also serves to ensure that the valve cone 49a and valve seat 48 always meet at the same point and that the actuators 52, 53 are not distorted.

To connect the protective valve 35 to the second conduit system 32 shown in FIG. 1, a so-called collar 63 is arranged on the face of the valve housing part 37 and is clamped to the housing part 37 by means of a release flange 64 arranged on the side opposite the valve housing part 37 and by means of screws or threaded bolts 65 which can be screwed into the threaded region 41 of the valve housing part 37. On the side facing the valve housing part 37, the collar 63 has an annular groove 66 in which a sealing device 67 is arranged which seals the connecting point of the valve housing part 37 and collar 63 fluid-tightly. The collar 63 is then welded to a pipe element of the second conduit system 32.

In the same way, a collar 68 with a ring groove 69 and a sealing device 70 is clamped to the valve housing cover 42 by means of a release flange 71 and several screws or threaded bolts 72, and welded to a pipe element of the second conduit system 32.

In an alternative embodiment, the collar 63 and the collar 68 are welded to the valve housing part 37 or the valve housing cover 42. In a further embodiment, the collar 63 and the valve housing part 37, and the collar 68 and the valve housing cover 42 respectively, are formed of one piece.

In normal operation, the spring device 50 acts against the leakage flow and prevents the closing of the protective valve 35, since the spring force of the spring device 50 is selected greater than the force acting through the fluid pressure on the valve tappet 49. If the temperature of the leakage flow rises because of a fault in the sealing water circuit, the actuators 52, 53 expand in the axial direction and move the valve tappet 49 via the rest device 51 towards the valve seat 48, wherein the protective valve 35 is closed and the leakage flow blocked. As soon as the valve is almost closed, a further hydraulic closing force acts on the tappet 49, in addition to the closing force of the actuators 52, 53. In this way, opening of the protective valve 35 is excluded even after a subsequent fall in temperature.

Opening of the protective valve 35 after a fall in temperature is possible only by opening the shut-off fitting 36 shown in FIG. 1 and by the associated pressure drop in front of the protective valve 35, or the drop in system pressure. The spring element 50 can return the valve tappet 49 to its starting position and thus restore functionality.

Figure 3:
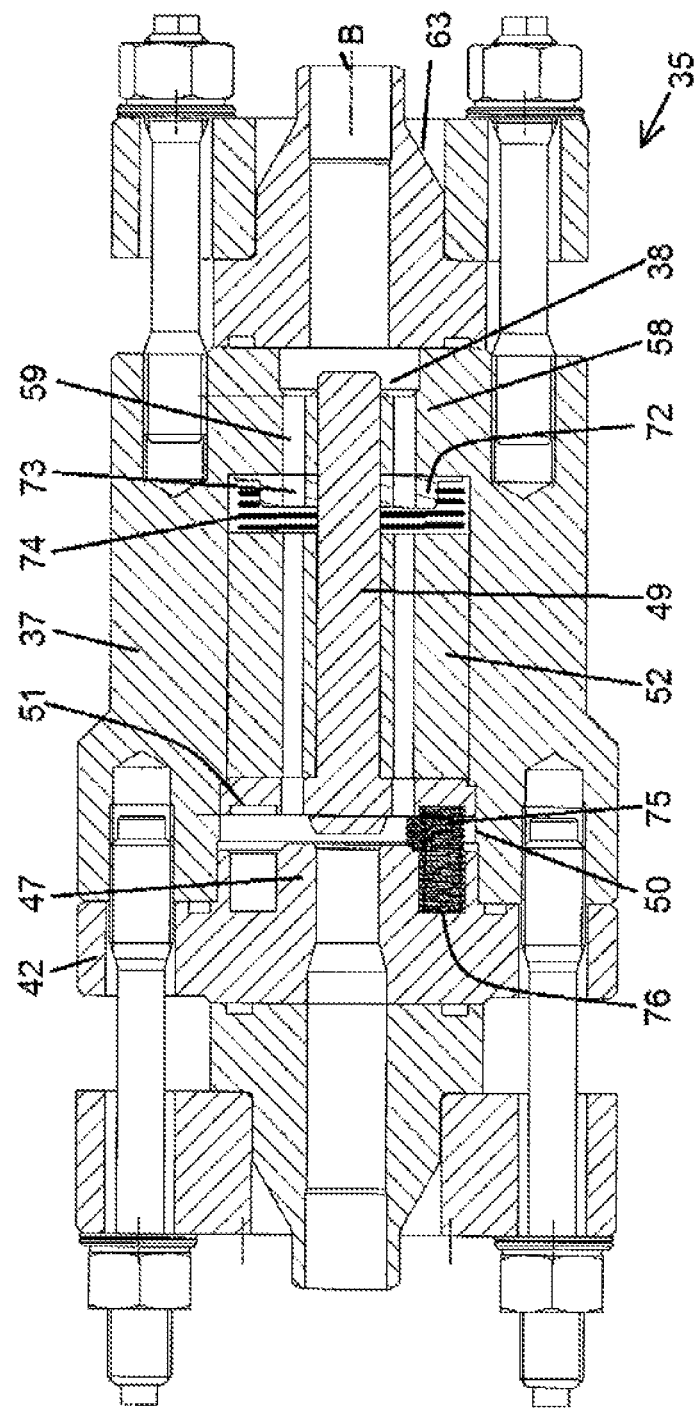

FIG. 3 shows a further embodiment of the protective valve 35. The housing portion 58 with passage openings 59 is formed on the face of the valve housing part 37 facing the collar 63. A guide element 72 with passage openings 73 aligned with the passage openings 59 lies on the housing portion 58 in the valve chamber 38. The guide element 72 stabilizes a supporting spring 74, which presses the thermosensitive actuator 52 against the rest device 51 of the valve tappet 49. This prevents the actuator 52—or for a multi-piece design, parts thereof—or the valve tappet 49 from moving to and fro uncontrolledly in the valve chamber 38 or twisting. Alternatively, the twist protection as described in detail for FIG. 2 may be used. By selection of a suitable distance, an idle travel may be created between the actuator 52 and the guide element 72, which can be used for adjustment of the switching point and force ratio. In the present embodiment, the spring device 50 is formed by a plurality of coil compression springs 75 which are arranged in blind holes 76 formed in the protrusion 47 of the valve housing cover 42, and act against the leakage flow and spring force of the support spring 74.

Figure 4:
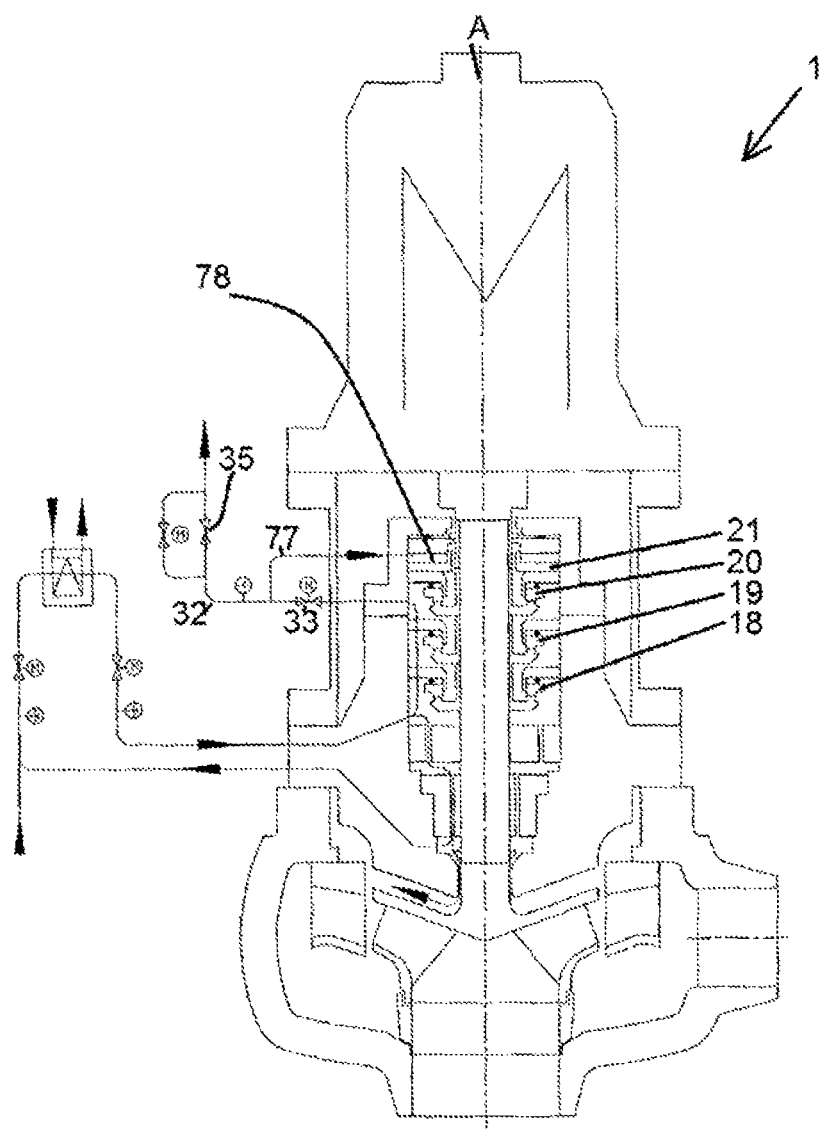

FIG. 4 shows a depiction of the pump arrangement 1 which substantially corresponds to the depiction shown in FIG. 1. Since a temperature increase of the leakage flow, as a serious equipment fault, is the only case in which a pressure build-up occurs before the protective valve 35, the pressure in the second conduit system 32 can be used to activate automatically any pressure-controlled seal 21 which may be present, and thus seal off the pump arrangement 1 hermetically and ensure its fluid-tightness independently of the axial face seals 18, 19, 20. For this, medium can be extracted from the leakage flow between the shut-off fitting 33 and the protective valve 35, via a conduit 77, and supplied to a pressure chamber 78 in the seal 21 arranged inside the chamber 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Pump arrangement
2 Housing
3 Interior
4 Inlet opening
5 Outlet opening
6 Orifice
7 Chamber
8 Impeller shaft
9 Orifice
10 Bearing arrangement
11 Impeller
12 Auxiliary impeller
13 Drive shaft
14 Drive motor
15 Motor housing
16 Lantern piece
17 Sealing system
18 Axial face seal
19 Axial face seal
20 Axial face seal
21 Seal
22 Sealing water system
23 Supply conduit
24 Shut-off fitting
25 Shut-off fitting
26 Temperature sensor
27 Temperature sensor
28 Cooler
29 First conduit system
30 Channel
31 Bypass channel
32 Second conduit system
33 Shut-off fitting
34 Temperature sensor
35 Protective valve
36 Shut-off fitting
37 Valve housing part
38 Valve chamber
39 Passage bore
40 Threaded region
41 Threaded region
42 Valve housing cover
43 Passage bore 44 Passage bore
45 Ring groove
46 Sealing device
47 Protrusion
48 Valve seat
49 Valve tappet
49a Valve cone
50 Spring device
51 Rest device
52 Actuator
53 Actuator
54 Holding device
55 Passage opening
56 Passage opening
57 Passage opening
58 Housing portion
59 Passage opening
60 Axial groove
61 Axial groove
62 Adjustment spring
63 Collar
64 Release flange
65 Threaded bolt
66 Ring groove
67 Sealing device
68 Collar
69 Ring groove
70 Sealing device
71 Release flange
72 Guide element
73 Passage opening
74 Support spring
75 Coil compression spring
76 Blind hole
77 Conduit
78 Pressure chamber
A Rotary axis
B Center longitudinal axis

The invention claimed is:

1. A pump arrangement, comprising:
    a pump housing, wherein the pump housing includes
        an interior portion configured to receive a pump impeller, the interior portion having an inlet opening configured to receive a medium, an outlet opening configured for discharge of the medium, and
        a chamber portion configured for passage of an impeller shaft configured to drive the pump impeller, wherein the chamber portion is in fluid communication with the interior portion;
    a sealing water system comprising a first conduit system configured to supply sealing water to the chamber portion;
    a second conduit system configured to evacuate a controlled leakage flow from the chamber portion; and
    a protective valve arranged in the second conduit system configured to block the controlled leakage flow from the chamber portion when a temperature of the controlled leakage flow exceeds a predetermined temperature, wherein the protective valve is not self-opening after blocking the controlled leakage flow and cooling.

2. The pump arrangement as claimed in claim 1, further comprising:
    a multi-stage hydrodynamic sealing system surrounding the impeller shaft in the chamber portion.

3. The pump arrangement as claimed in claim 2, wherein the multi-stage hydrodynamic sealing system include a plurality of spring-mounted axial face seals.

4. The pump arrangement as claimed in claim 3, wherein the multi-stage hydrodynamic sealing system includes a pressure-controlled seal configured to be open during pump operation.

5. The pump arrangement as claimed in claim 4, wherein the pressure-controlled seal is a nitrogen seal or a water seal.

6. The pump arrangement as claimed in claim 4, wherein the second conduit system is configured to supply at least a portion of the controlled leakage flow to a pressure chamber inside the chamber portion configured to apply pressure to the pressure-controlled seal.

7. The pump arrangement as claimed in claim 1, wherein the second conduit system includes a shut-off fitting arranged in parallel with the protective valve.

8. The pump arrangement as claimed in claim 3, wherein the protective valve includes
    a valve housing having a longitudinal center axis,
    a valve chamber formed in the valve housing,
    a valve housing cover having a valve seat and a passage bore in fluid communication with the valve chamber,
    a valve tappet having a valve cone and a rest portion,
    a spring supported on the valve housing cover and the rest portion of the tappet to bias the tappet valve cone along the longitudinal center axis away from the valve seat, and
    thermosensitive actuators arranged on a side of the rest device opposite the spring device, the thermosensitive actuators being configured to expand on heating an amount sufficient to overcome the spring bias and engage the tappet valve cone with the valve seat to close the valve.

* * * * *